United States Patent
Asaad et al.

(10) Patent No.: US 6,675,237 B1
(45) Date of Patent: Jan. 6, 2004

(54) SYSTEM AND INTELLIGENT DOCK USING A SYMMETRIC EXTENDED BUS BRIDGE AND METHOD THEREFOR

(75) Inventors: Sameh W. Asaad, Mahopac, NY (US); Nicholas R. Dono, Hopewell Junction, NY (US); Ernest Nelson Mandese, Durham, NC (US); Bengt-Olaf Schneider, Yorktown Heights, NY (US); Kevin W. Warren, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 09/633,826

(22) Filed: Aug. 7, 2000

(51) Int. Cl.[7] ................................................. G06F 3/02
(52) U.S. Cl. ........................... 710/41; 710/15; 710/106; 712/225; 709/212; 709/238
(58) Field of Search .............................. 710/1, 5, 18, 20, 710/41, 105, 106, 15, 31; 709/200, 201, 202–203, 212, 213–216, 238; 712/225

(56) References Cited

U.S. PATENT DOCUMENTS

| 5,831,980 | A | * | 11/1998 | Warma et al. ............... 370/395 |
| 6,070,214 | A | | 5/2000 | Ahern |
| 6,084,874 | A | * | 7/2000 | Ngyen et al. ................ 370/352 |
| 6,148,356 | A | * | 11/2000 | Archer et al. ................ 710/127 |
| 6,230,224 | B1 | * | 5/2001 | Kim ............................ 710/128 |
| 6,385,196 | B1 | * | 5/2002 | Hayball et al. ............. 370/356 |
| 6,418,504 | B2 | * | 7/2002 | Conway et al. ............. 710/313 |
| 6,434,650 | B1 | * | 8/2002 | Morris et al. ................ 710/110 |
| 6,496,508 | B1 | * | 12/2002 | Breuckheimer et al. .... 370/397 |

* cited by examiner

Primary Examiner—Jeffrey Gaffin
Assistant Examiner—Rijue Mai
(74) Attorney, Agent, or Firm—Gail H. Zarick, Esq.; McGinn & Gibb, PLLC

(57) ABSTRACT

A computer network system includes a plurality of computers each including a central processing unit (CPU), a memory and at least one peripheral device, a connection fabric having selectable first and second sides, the first side being coupled to a first computer of the plurality of computers and the second side being coupled to at least a second computer of the plurality of computers. Each of the first and second computers performs a negotiation to determine which one of the first and second computers controls resources of the other of the first and second computers.

28 Claims, 5 Drawing Sheets

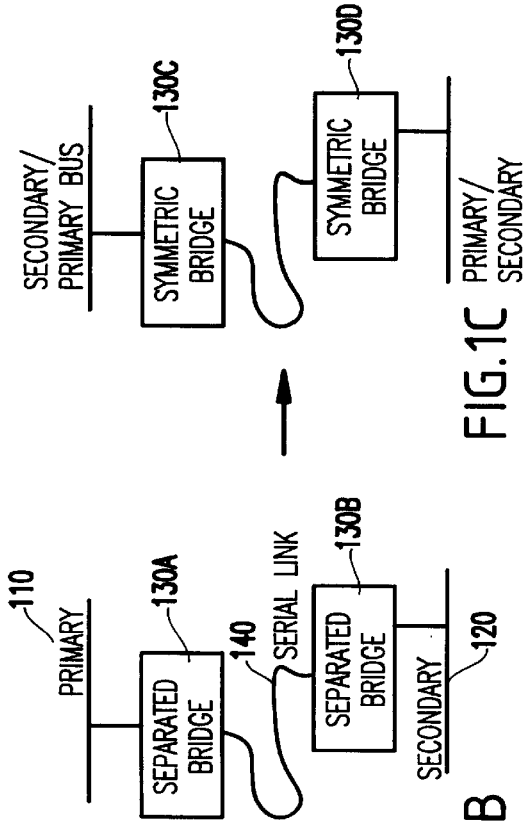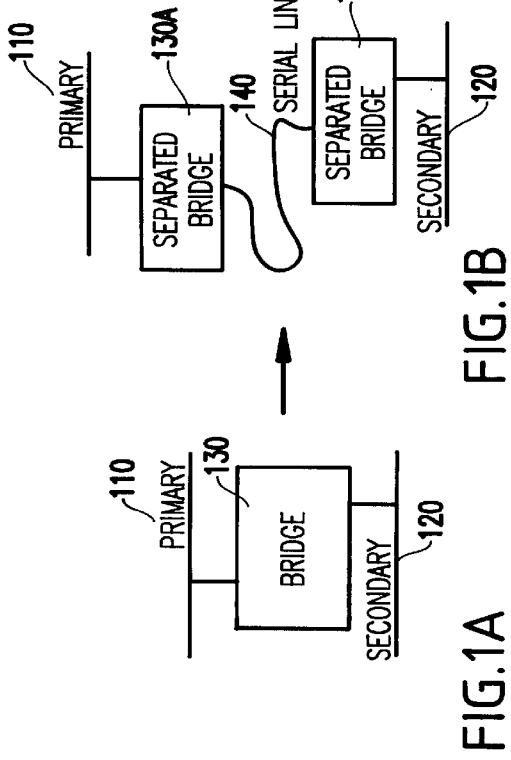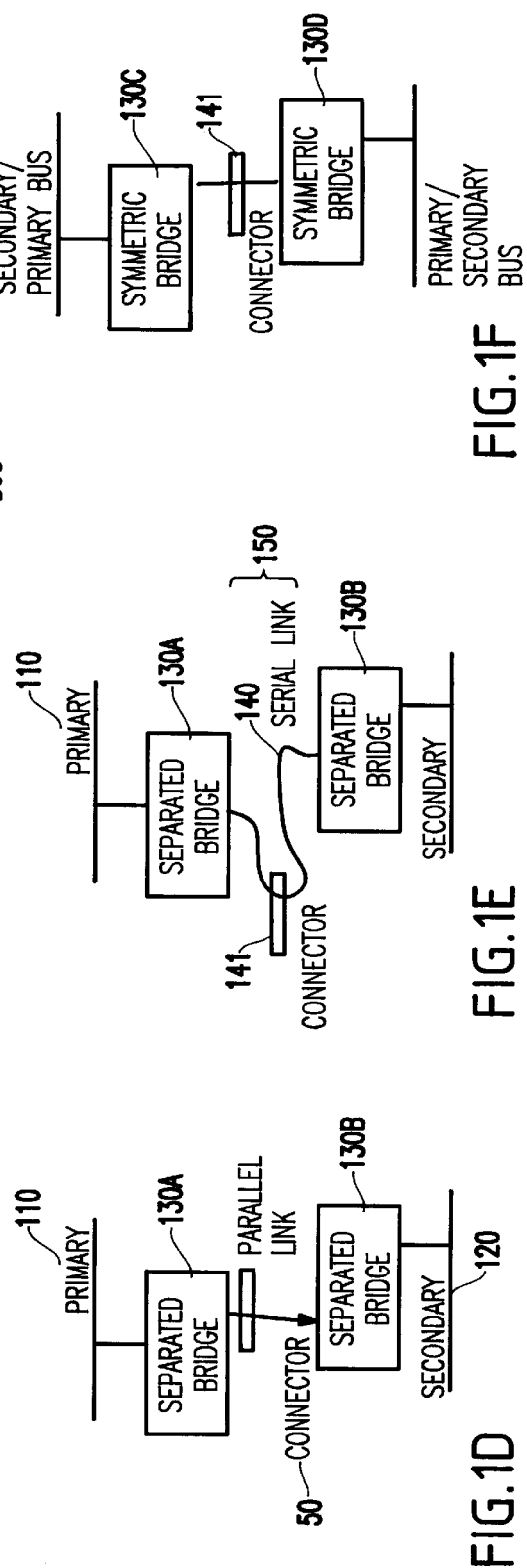

SYSTEM AND INTELLIGENT DOCK USING A SYMMETRIC EXTENDED BUS BRIDGE AND METHOD THEREFOR

CROSS-REFERENCE TO RELATED APPLICATIONS

The present application relates to U.S. patent application Ser. No. 09/633,806, filed on Aug. 7, 2000, to Sameh Asaad et al., entitled "METHOD AND SYSTEM FOR HIGH RESOLUTION DISPLAY CONNECT THROUGH EXTENDED BRIDGE", and to U.S. patent application Ser. No. 09/633,825, filed on Aug. 7, 2000, to Sameh Asaad et al., entitled "METHOD AND SYSTEM FOR TRANSPORTING SIDEBAND SIGNALS THROUGH PHYSICAL LAYER OF EXTENDED BRIDGE", and to U.S. patent application Ser. No. 09/633,856, filed on Aug. 7, 2000, to Sameh Asaad et al., entitled "COMMUNICATIONS SYSTEM INCLUDING SYMMETRIC BUS BRIDGE AND METHOD USED THEREWITH", and to U.S. patent application Ser. No. 09/633,876, filed on Aug. 7, 2000, to Sameh Asaad et al., entitled "ALL-IN-ONE MOBILE DOCKING STATION AND SYSTEM USED THEREWITH", each of which is incorporated herein by reference.

BACKGROUND OF THE INVENTION

1. Field of the Invention

The present invention generally relates to a system, method, and docking station for a mobile computer, and more particularly to a system and method having an "intelligent" docking station including a central processing unit (CPU) to increase an amount of computing power for the mobile computer.

2. Description of the Related Art

Many mobile computer units do not have sufficient computing power to make them viable for home or office desktop systems when used in traditional docking stations. The trade-off among CPU power, weight, battery consumption, etc. limit the design options.

Furthermore, when the mobile unit is disconnected from conventional docking stations, the resources on the dock are unavailable for use by other systems and components.

Additionally, conventional docking stations do not incorporate any additional computing power (e.g., a second central processing unit (CPU)) to manage dock resources or perform other functions, when the mobile unit is disconnected.

Furthermore, the bridge technology used in bridging the docking station and the mobile computer is not symmetric. For purposes of the present application, "symmetric" is defined as defining the role of a bus (primary/secondary) dynamically under software control. Thus, a symmetric bridge is a bridge that can swap primary and secondary roles under CPU control. Typically, the conventional bridge technology merely provides one fixed primary (master) and one or more secondary (slave) busses.

For example, Mobility Electronics (e.g., see http://www.mobilityelectronics.com/index2.htm) describes several applications of extended peripheral component interconnect (PCI) bridges, but is silent as to symmetric bridges.

Further, conventional docks do not use symmetric bridges, thereby resulting in a fixed allocation of assets and resources and inefficiencies. Without a symmetric bridge, it is impossible for conventional docks to assume the role of master and utilize the mobile unit's resources.

Further, conventional docks cannot function without the mobile unit. E-mail, fax, remote connector services, etc. and are unavailable when the mobile unit is disconnected.

SUMMARY OF THE INVENTION

In view of the foregoing and other problems of the conventional methods and structures, an object of the present invention is to provide a docking structure which is provided with computing power to manage dock resources or perform other functions, even when a mobile unit is disconnected from the docking station.

Another object is to provide a symmetric bridge for bridging the docking station and the mobile computer.

In a first aspect of the present invention, a computer network system includes a plurality of computers each including a central processing unit (CPU), a memory and at least one peripheral device, a connection fabric having first and second sides, the first side being coupled to a first computer of the plurality of computers and the second side being coupled to at least a second computer of the plurality of computers. Each of the first and second computers performs a negotiation to determine which one of the first and second computers controls resources of the other of the first and second computers.

With the unique and unobvious aspects of the present invention, an "intelligent dock" is provided which includes a CPU formed therein, unlike the conventional ("dumb") mobile computing docking stations. This capability allows the user to connect a mobile unit to the dock, and optionally (selectively) use either the computer in the dock or the mobile unit. In addition, the dock can remain active even when the mobile unit is removed.

With the intelligent dock of the invention, the user is provided with potentially more CPU power to extend the capabilities of the mobile unit and to provide standby CPU (or low cost embedded processor) power when the mobile unit is disconnected. Thus, the structure of the invention maintains use of the dock's resources, for example, in networked situations (e.g. modem fax or ftp server or to run software agents on behalf of the user).

Further, the invention is advantageous in an inverse situation (e.g., inverse to the above where a relatively weak portable CPU connects with a powerful stationary CPU (e.g., a dock or desktop computer). In this case, the user can perform simple operations etc. while mobile, yet can continue to operate on the data with more complex operations while docked.

BRIEF DESCRIPTION OF THE DRAWINGS

The foregoing and other purposes, aspects and advantages will be better understood from the following detailed description of a preferred embodiment of the invention with reference to the drawings, in which:

FIG. 1(a) illustrates a peripheral component interconnect (PCI)-to-PCI bus bridge 130;

FIG. 1(b) illustrates an extended serial bridge;

FIG. 1(c) illustrates an extended "symmetric" bridge separating the two sides of the bridge using parallel connectors;

FIG. 1(d) illustrates an extended parallel bridge separating the two sides of the bridge using parallel connectors 150;

FIG. 1(e) illustrates an extended serial bridge separating the two sides of the bridge using a serial communications layer 150 and connector 141;

FIG. 1(f) illustrates an extended "symmetric" bridge separating the two sides of the bridge using parallel connectors 141;

DETAILED DESCRIPTION OF PREFERRED EMBODIMENTS OF THE INVENTION

Figure 2B:
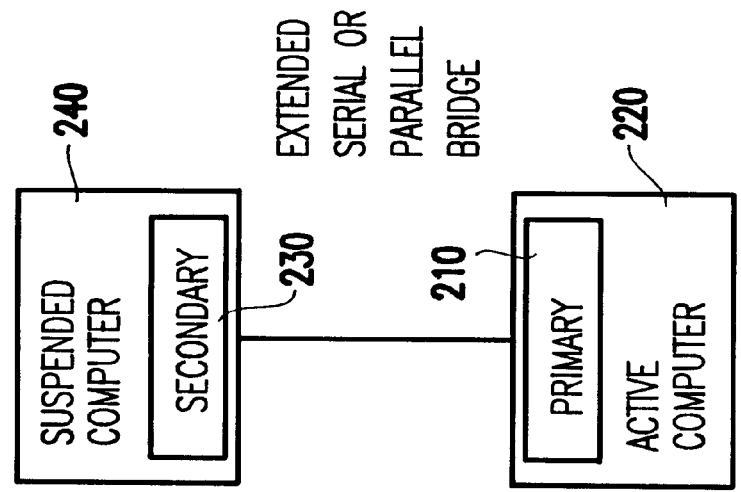
FIG. 2(b) illustrates an extended serial or parallel bridge in which the locations of the computers have been swapped.

Referring now to the drawings, and more particularly to FIGS. 1(a)–6, there are shown preferred embodiments of the method and structures according to the present invention.

Preferred Embodiment

Turning to FIG. 1(a), an exemplary Peripheral Component Interconnect (PCI)-to-PCI bus bridge is a PC standard architectural component. As shown in FIG. 1(a), there is a primary side (bus) 110 and a secondary side (bus) 120, with a conventional bridge 130 therebetween.

FIG. 1(b) illustrates an extended bridge which separates the two sides of the bridge. That is, FIG. 1(b) shows separated bridges 130A, 130B between primary and second sides (busses) 110, 120 coupled by a serial link 140.

FIG. 1(c) illustrates an extended bridge structure using a symmetric bridge 130C, 130D on the primary and secondary busses.

FIG. 1(d) illustrates a separated bridge 130A, 130B using a parallel connector 150, and FIG. 1(e) illustrates a bridge using a serial communications layer 160 including a connector 141 and serial link 140. This layer uses a high bandwidth, low latency serial link 140, commensurate with the PCI standard's requirements. A first side of the separated bridge is placed on the primary bus, while the other side is implemented on the secondary bus or bus extension.

A converter called a serial link (140) 150 takes the parallel bus data into a serial stream and back for the communication layer. This serial stream can be supported on four wires or pins as opposed to the typical 49 or more wires of the bus. The system is not aware of the separation. Most standard adapters can be driven off a secondary bus.

Referring to FIG. 1(c) and to FIG. 1(f), the symmetric bridge allows the roles of primary (master) and secondary (slave) bus to be defined dynamically (selectively) under software control. The symmetric bridge can be configured either as a standard PCI-to-PCI bridge (e.g., as in FIG. 1(a) or as an extended bridge (e.g., as in FIGS. 1(b)–1(f)). The symmetric bridge configuration assumes that both sides of the bridge are controlled by separate CPUs (e.g., in the exemplary embodiment by the CPU in the mobile unit and by the CPU in the inventive dock). Until the bridge is configured (at initialization or when the bridges are connected), the separate busses are not connected logically. Each CPU has access to the resources on its bus only. Each sees its bus as the master bus.

Figure 2A:
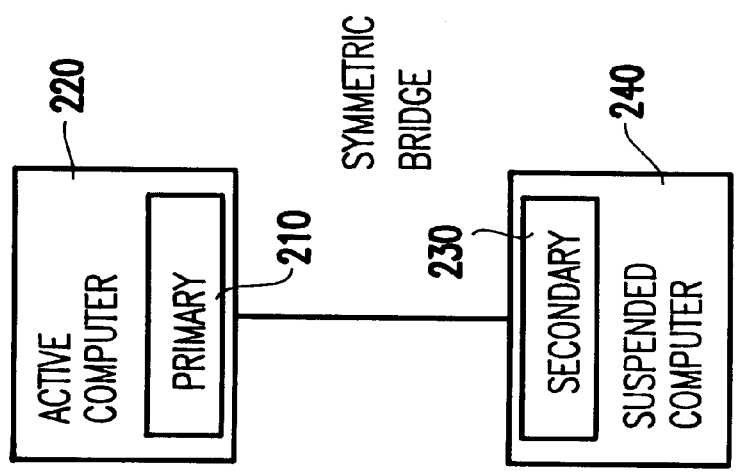
FIG. 2(a) illustrates an active computer 220 on a primary bus of the symmetric bridge is connected to a secondary bus 230 for a suspended computer 240 via the symmetric bridge.

Turning to FIG. 2(a), once the bus is configured, one side is set in the role of the primary (as discussed below) and continues in the role of primary bus 210 and its CPU is the active computer 220.

The other side is configured as the secondary bus 230 and its computer is no longer in control (e.g., the suspended computer 240) of its own resources. All the resources on the primary and secondary busses are available to the active computer 220. The symmetric bridge concept is not limited to the PCI architecture, but also can be used to support other bus standards as well such as Accelerated Graphics Port (AGP), Microchannel, VME, SGI, etc.

The CPUs 220, 240 negotiate (as described below) to decide which unit should suspend control (e.g., of the bus and its own resources) and which unit should take ownership of the combined resources in the dock and on the mobile unit. The performance of the negotiation and exemplary criteria used in determining master and slave is described below.

For an I/O bus such as the PCI or Accelerated Graphics Port (AGP) bus, a symmetric bridge is a bridge that can selectively swap primary and secondary roles under CPU control. The ability to swap master/slave roles is necessary to program the system to correctly handle the flow of bus traffic.

Figure 3:
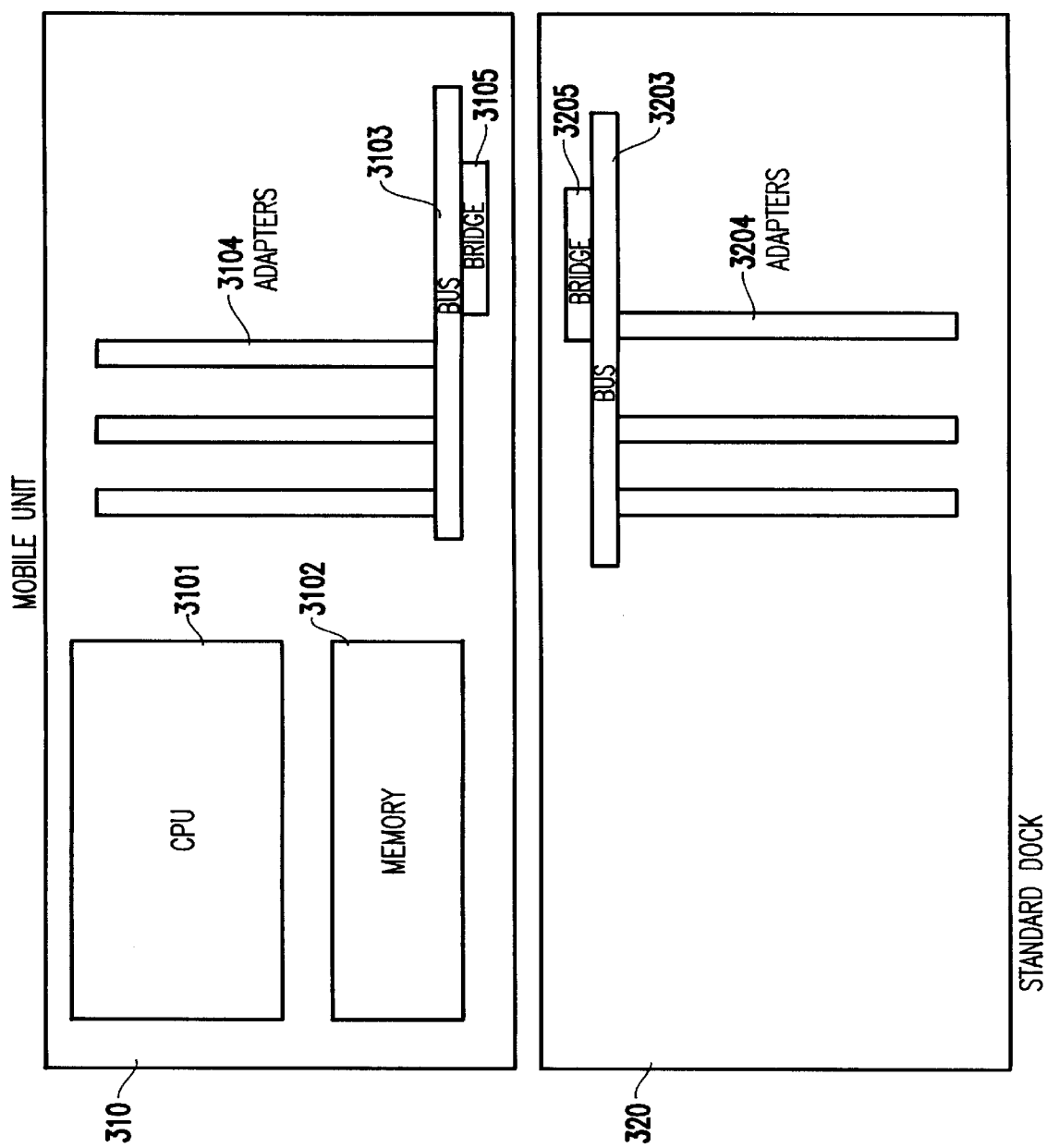
FIG. 3 illustrates a conventional dock 320 for coupling to a mobile computer unit 310.

In a conventional dock configuration, as shown in FIG. 3, a mobile unit 310 connects over the extended bridge to access the components in the dock 320.

The mobile unit 310 includes a CPU 3101, a memory 3102, a bus 3103, a plurality of adaptors 3104 for coupling to different components, and a bridge portion 3105 coupled to the bus. The conventional dock 320 simply includes a bus 3203, a plurality of adaptors 3204 for coupling to different components, and a bridge portion 3205 for coupling to the bridge portion 3105. There is no memory or CPU capabilities, only resources (e.g., disk, DVD, graphics, sound, etc.).

Figure 4:
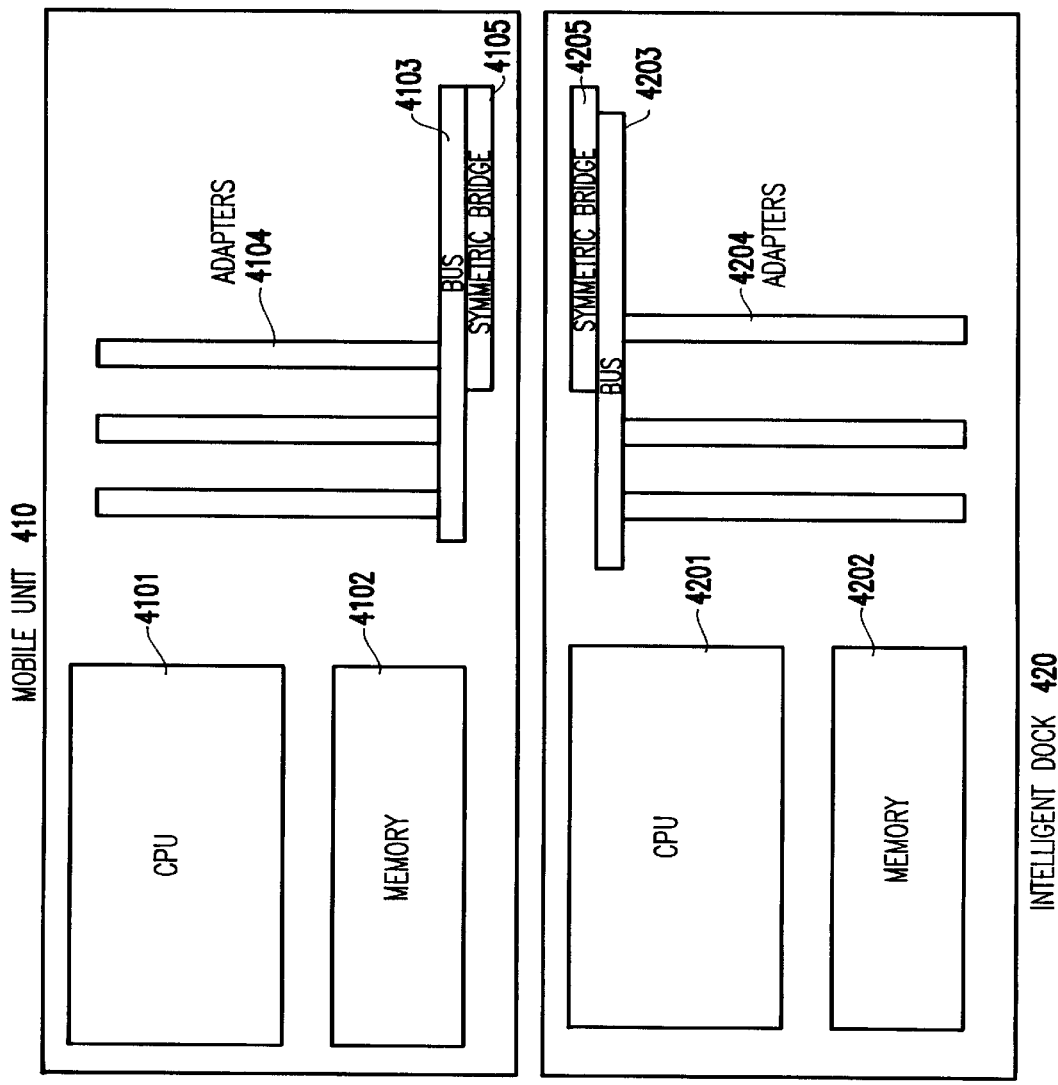
FIG. 4 illustrates schematically an exemplary configuration of an "intelligent" dock 420 for coupling to a mobile computer unit 410, according to a first embodiment of the present invention.

In an exemplary embodiment of the present invention, as shown in FIG. 4, a configuration includes a mobile unit 410 (e.g., having a CPU 4101, memory 4102, a bus 4103, adapters 4104, and a symmetric bridge 4105, and an "intelligent dock" 420 (e.g., having a CPU 4201, memory 4202, a bus 4203, adapters 4204, and a symmetric bridge 4205) to allow for its stand-alone use) is provided which can be in one of three active states.

In the undocked state, both the mobile unit CPU 4201 and the dock CPU 4201 can be active. In this state, each unit functions as an independent computer system. Unlike traditional docks that serve no function when the mobile unit 410 is disconnected, the intelligent dock 420 can be used in a variety of ways, for example, to maintain a fax tool, respond to network requests (ftp, telnet or web page), receive e-mail, etc.

When in a docked state, either CPU 4101, 4201 can be in the active state. This allows the user to choose a higher-powered (e.g., higher MIPs processing speed, more computational resources, etc.) docking CPU to support desktop needs not met by today's mobile units, or to just maintain a minimum of undocked power using an inexpensive embedded controller to provide modem and world-wide network (e.g., Internet) functions in the dock.

As shown in FIG. 4, the Intelligent Dock includes an exemplary symmetric PCI bus bridge providing either the CPU 4201 in the dock 420 or the CPU 4101 in the mobile unit 410 access to all the resources attached to the bus 4103 when docked.

The active computer (e.g., the mobile unit) makes its local bus 4103 the primary bus and directs the bridge 4105 to make its other half (e.g., the bus 4203 in the dock 420) a secondary bus. The computer that originally was "master" of the now secondary bus can be suspended (or quiesced) leaving the active computer in full control of all bus resources (such as storage, video, multimedia devices, etc.).

A conventional docking station is achieved when the mobile CPU 4101 is in control of the dock's resources. In the inventive intelligent dock 420, the bridge 4205 is originally set to a default state where both sides of the bridge 4105, 4205 initialize so that there is no electronic (logical) path through the bridge. The two computers (CPUs 4101, 4201) negotiate by out-of-band signals (e.g., such as Universal System Bus (USB), network connection or a separate path or protocol made available in the bridge for this purpose).

Figure 5:
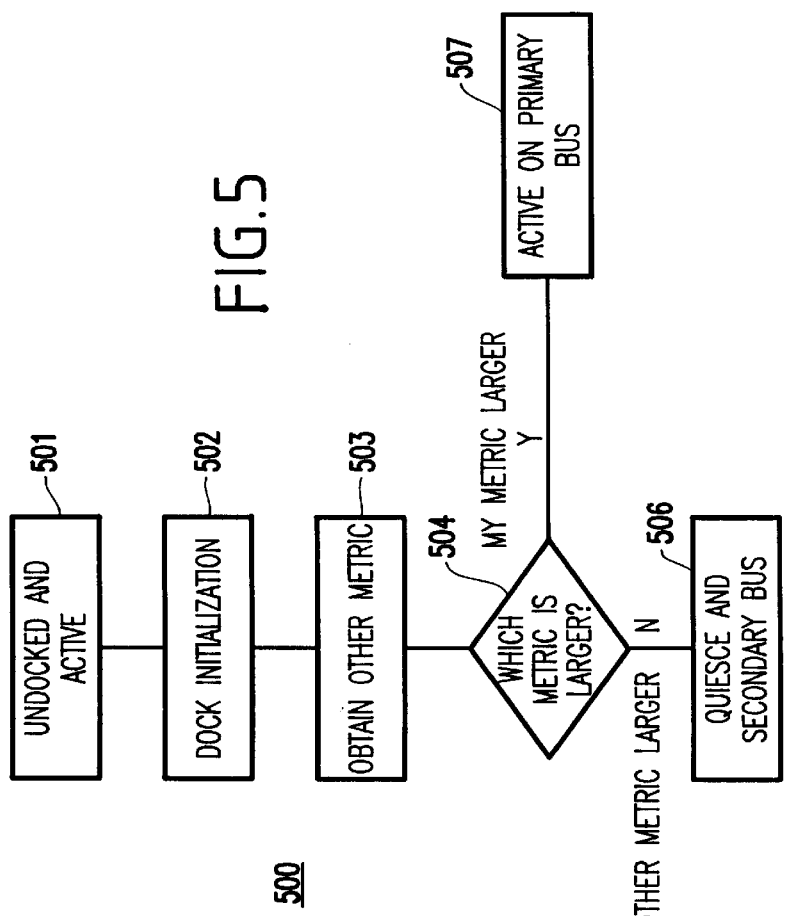
FIG. 5 illustrates an exemplary flow diagram of a method 500 of performing a negotiation between first and second for the primary bus.

Turning to FIG. 5, a method of negotiating between a plurality of computers to determine a primary bus (and thus control of other computers' resources) will be described hereinbelow.

First, in step 501, one computer is undocked (active) and the other computer is active. Thus, both computers are active.

In step 502, dock initialization is performed.

In step 503, a metric of the other computer(s) is obtained for comparison purposes.

In step 504, a decision (e.g., comparison) is made by each side whether its metric is greater than the other side's metric. If the other computer's metric is larger (a "NO" in step 504), then the present computer suspends and its bus is designated as a secondary bus in step 506.

If the present computer's metric is larger (a "YES" in step 504), then in step 504, the present computer is deemed the master and its bus is active on the primary bus, as shown in step 507.

Thus, in the inventive method, one CPU decides to suspend after setting its side of the bridge as the "secondary" bus. The other side stays active and sets its side of the bridge as the "primary" bus.

At this point, the active CPU has access to all of the resources on the primary and secondary busses. As is clear to one of ordinary skill in the art taking the present application, if the result of negotiation is opposite to the previous scenario, then the roles of active and suspended are reversed (e.g., as shown in FIG. 2).

The present invention is not limited to two computers in the exemplary configuration. That is, the concept generalizes to more than two computers. In such a case, the inventive concept requires that at least one computer has multiple bridge chips (e.g., a star configuration) or that all computers have at least two bridge chips (e.g., a ring configuration) or multiple bridge chips to realize some other topology.

The negotiation protocol requires that the participating computers exchange a capability metric that may include, for example, a weighted average of various computer performance measurements and a random number to use in the case of a "tie" (e.g., conflict).

A random "tie-breaker" may be set up in advance and may be any unique numeric item in a system (e.g., Network Interface Card (NIC) address, system serial number, etc.) or combination of time of day clock, and random number generator. The processor with the highest capability metric becomes the active CPU, all others suspend.

For simplicity and ease of use, the performance measurements may include any of the published bench marking tools.

For example, the performance measurements may include any one or more of the manufacturer's MIP rating (MHz), cache size (KB), memory size (MB), front end bus speed (MB/s) and disk I/O speed (MB/s) were used with the following weighting factors: MIPF=0.4, CacheF=0.2, MemF=0.2, FrontF=0.1, IOF=1.

Figure 6:
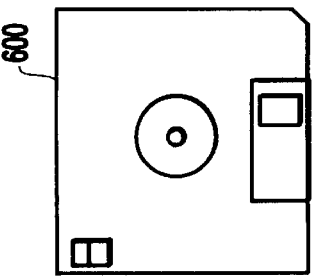
FIG. 6 illustrates an exemplary storage medium for storing a program of the method 500 of performing a negotiation.

As shown in FIG. 6, in addition to the hardware and process environment described above, a different aspect of the invention includes a computer-implemented method for performing a negotiation by a plurality of computers. As an example, this method may be implemented in the particular hardware environment discussed above with regard to FIG. 4.

Such a method may be implemented, for example, by operating the CPU 4201 or 4202 (FIG. 4), to execute a sequence of machine-readable instructions. These instructions may reside in various types of signal-bearing media as described below.

Thus, this aspect of the present invention is directed to a programmed product, comprising signal-bearing media tangibly embodying a program of machine-readable instructions executable by a digital data processor incorporating the CPU 4101, 4201 and hardware above, to perform method steps for performing a negotiation by a plurality of computers, This signal-bearing media may include, for example, a memory (e.g., RAM) contained externally or within the CPU, as represented by fast-access storage for example. Alternatively, the instructions may be contained in another signal-bearing media, such as a magnetic data storage diskette 600, EPROM, FPGA, etc. (FIG. 6), directly or indirectly accessible by the CPU.

Whether contained in the diskette 600, the computer, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device. (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

What is claimed is:

1. A computer system, comprising:
    a plurality of computers each including a central processing unit (CPU), a memory and at least one peripheral device;
    a connection fabric having selectable first and second sides, said first side being coupled to a first computer of said plurality of computers and said second side being coupled to at least a second computer;
    a dock containing one of said first and second computers, and
    a mobile unit containing the other of said first and second computers, wherein said first and second computers negotiate to decide which of said first and second computers should suspend control and which of said first and second computers should take ownership of combined resources in said dock and on said mobile unit.

2. The system according to claim 1, wherein all but one computer of said plurality of computers grants access to its memory and peripheral device to a particular one of the plurality of computers.

3. The system according to claim 2, wherein the plurality of computers negotiate which computers will grant access and which computers will gain access to the other computers' memory and peripheral device.

4. The system according to claim 3, wherein the negotiation occurs over a connection other than the connection fabric.

5. The system according to claim 3, wherein the negotiation occurs through out-of-band signaling on the connection fabric.

6. The system according to claim 1, wherein the connection fabric comprises a network connection.

7. The system according to claim 1, wherein the connection fabric comprises a symmetric split bridge.

8. The system according to claim 1, wherein said negotiation determines a master computer and a set of slave computers,
said master computer controlling resources of all of said plurality of computers.

9. The system according to claim 8, wherein a computer other than said master computer is designated as a slave computer.

10. The system according to claim 8, wherein a set of slave computers includes a plurality of computers other than said master computer.

11. The system according to claim 1, wherein upon designation of a master computer, remaining ones of said plurality of computers no longer control their own resources such that all resources on primary and secondary busses are available to the computer designated as said master computer.

12. The system according to claim 1, wherein said connection fabric comprises a symmetric bridge for selectively swapping primary and secondary roles under CPU control.

13. The system according to claim 1, wherein one of said first and second computers resides in a mobile unit and the other of said first and second computers resides in a dock for being selectively coupled to said mobile unit.

14. The system according to claim 13, wherein said dock is operable in one of a plurality of active states, with or without said mobile unit being received in said dock.

15. The system according to claim 13, wherein in an undocked state, the mobile unit CPU and the dock CPU are active, such that each functions independently.

16. The system according to claim 13, wherein in a docked state, either of said mobile unit CPU and said dock CPU is in an active state.

17. A network system, comprising:
a plurality of computers including a first computer coupled to at least one other computer,
each of said computers including a module for negotiating which one of the computers will be a primary computer, remaining ones of the computers being set as secondary computers, such that said primary computer controls resources of said primary computer and said secondary computers,
wherein each one of said plurality of computers negotiates to decide which of said plurality of computers should suspend control and which should take ownership of the combined resources of said primary computer and said secondary computers.

18. A method of forming a computer network having a plurality of computers, comprising:
connecting a first computer to at least one other computer; and
negotiating by said first computer and said at least one other computer, to determine which one of said computers will be a primary computer, remaining ones of said plurality of computers being set as secondary computers, such that said primary computer controls resources of said primary computers and said secondary computers,
wherein said secondary computers suspend control after being set as secondary computers.

19. A method of performing a negotiation by a plurality of computers, comprising:
coupling a first computer to at least a second computer;
exchanging and comparing a capability metric of said first computer with that of said second computer; and
based on said comparing, determining which of said first and second computers has access to a primary bus and which of said first and second computers will be limited to a secondary bus,
wherein a central processing unit (CPU) processor of said computer having the highest capability metric is designated as a master computer and becomes an active CPU, and all others suspend, such that one CPU decides to suspend after setting its side of the bridge as a secondary bus and the other side stays active and sets its side of the bridge as a primary bus.

20. The method according to claim 19, wherein said capability metric includes at least one of a plurality of computer performance measurements.

21. The method according to claim 19, wherein said capability metric further includes a random number for use if a tie results in said comparing.

22. The method according to claim 20, wherein a weighted average of said plurality of performance measurements is used.

23. The method according to claim 19, wherein the active CPU has access to all resources on the primary and secondary busses.

24. A dock for selectively receiving a mobile computer unit, said dock comprising:
a central processing unit (CPU);
a memory coupled to said CPU;
at least one peripheral device for being controlled by said CPU; and
a connection fabric having selectable first and second sides, said first side being coupled to said CPU and said second side being coupled to said mobile computer unit,
wherein said CPU performs a negotiation to determine whether the CPU of the dock will control resources of the mobile computer unit, and
wherein, when said negotiation determines the CPU of the dock controls resources of the mobile computer unit, said mobile computer unit suspends control after setting an access to said second side.

25. A programmable storage device, readable by a machine, tangibly embodying instructions to perform a method for performing a negotiation by a plurality of computers, said method comprising:

coupling a first computer to at least a second computer;

exchanging and comparing a capability metric of said first computer with that of said second computer; and based on said comparing, determining which of said first and second computers has access to a primary bus and which said first and second computers will be limited to a secondary bus, wherein said one of said first and second computers limited to said secondary bus, suspends control after setting an access to said secondary bus.

26. A programmable storage device, readable by a machine, tangibly embodying instructions to perform a method for forming a computer network having a plurality of computers, said method comprising:

connecting a first computer to at least one other computer; and negotiating by said first computer and said at least one other computer, to determine which one of said computers will be a primary computer, remaining ones of said plurality of computers being set as secondary computers, such that said primary computer controls resources of said primary computers and said secondary computers, wherein said remaining ones of said plurality of computers suspend control after setting themselves to be secondary computers.

27. A computer system, comprising:

a plurality of computers each including a central processing unit (CPU), a memory and at least one peripheral device; and a connection fabric having selectable first and second sides, said first side being coupled to a first computer of said plurality of computers and said second side being coupled to at least a second computer, each of said first and second computers performing a negotiation to determine which computer in the connecting computers will become a primary computer connected to a primary bus and will have control over combined resources of its own and the other of said first and second computers.

28. The system of claim 27, wherein the first and second computers are selectively enabled as the primary and secondary sides of the bridge, such that roles of said first and second computers are unfixed and each side of the connection fabric is equally operable as the primary side or as the secondary side, thereby enabling switching of the bus roles from the primary to the secondary and vice versa, wherein the connection fabric splits the primary side from the secondary side.

* * * * *